US011993281B2

(12) United States Patent
Wray et al.

(10) Patent No.: US 11,993,281 B2
(45) Date of Patent: May 28, 2024

(54) LEARNING IN LANE-LEVEL ROUTE PLANNER

(71) Applicants: Nissan North America, Inc., Franklin, TN (US); The University of Massachusetts, Boston, MA (US)

(72) Inventors: Kyle Hollins Wray, Mountain View, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 89 days.

(21) Appl. No.: 17/186,987

(22) Filed: Feb. 26, 2021

(65) Prior Publication Data

US 2022/0274624 A1    Sep. 1, 2022

(51) Int. Cl.
*B60W 60/00* (2020.01)
*B60W 40/04* (2006.01)
*G01C 21/00* (2006.01)
*G01C 21/34* (2006.01)

(52) U.S. Cl.
CPC .......... *B60W 60/001* (2020.02); *B60W 40/04* (2013.01); *B60W 60/0053* (2020.02); *G01C 21/3407* (2013.01); *G01C 21/3461* (2013.01); *G01C 21/3889* (2020.08);

(Continued)

(58) Field of Classification Search
CPC .......... B60W 60/001; B60W 60/0053; B60W 40/04; B60W 2556/50; B60W 2554/4029; B60W 2554/404; G01C 21/3889; G01C 21/3407; G01C 21/3461

See application file for complete search history.

(56) References Cited

U.S. PATENT DOCUMENTS

| 9,212,920 B1 | 12/2015 | Mannepalli et al. |
| 10,372,130 B1 | 8/2019 | Kaushansky et al. |
| 10,969,232 B1 | 4/2021 | Johnson et al. |

(Continued)

FOREIGN PATENT DOCUMENTS

| CN | 111076731 A | 4/2020 |
| DE | 102009047410 A1 | 6/2011 |

(Continued)

OTHER PUBLICATIONS

Wray et al., Multi-Objective POMDPs for Robust Autonomy; RSS 2020 Workshop Robust Autonomy; Jun. 15, 2020; 3 pages https://openreview.net/pdf?id=xewBjsJEKkR.

(Continued)

*Primary Examiner* — Anne Marie Antonucci
*Assistant Examiner* — Patrick M Brady
(74) *Attorney, Agent, or Firm* — Young Basile Hanlon & MacFarlane, P.C.

(57) ABSTRACT

Lane-level route planning includes obtaining lane-level information of a road, where the road includes a first lane and a second lane and the lane-level information includes first lane information related to the first lane and second lane information related to the second lane; converting the lane-level information to probabilities for a state transition function; receiving a destination; and obtaining a policy as a solution to a model that uses the state transition function.

20 Claims, 6 Drawing Sheets

(52) U.S. Cl.
CPC ............... *B60W 2554/4029* (2020.02); *B60W 2554/404* (2020.02); *B60W 2556/50* (2020.02)

(56) References Cited

U.S. PATENT DOCUMENTS

| | | | |
|---|---|---|---|
| 11,199,841 B1* | 12/2021 | Van Den Berg | B60W 60/0011 |
| 2005/0107951 A1 | 5/2005 | Brulle-Drews et al. | |
| 2009/0210143 A1 | 8/2009 | Seltzer et al. | |
| 2009/0271050 A1* | 10/2009 | Niki | G08G 1/22 701/1 |
| 2016/0098496 A1* | 4/2016 | Joshi | E01C 1/02 703/1 |
| 2016/0176397 A1 | 6/2016 | Prokhorov et al. | |
| 2016/0347327 A1* | 12/2016 | Kondo | B60W 50/0098 |
| 2017/0227966 A1* | 8/2017 | Monzen | B62D 15/0255 |
| 2017/0328725 A1 | 11/2017 | Schlesinger et al. | |
| 2018/0017398 A1 | 1/2018 | McNew | |
| 2018/0209801 A1 | 7/2018 | Stentz et al. | |
| 2018/0273032 A1 | 9/2018 | Yang et al. | |
| 2018/0299290 A1* | 10/2018 | Slavin | G08G 1/0145 |
| 2019/0033861 A1 | 1/2019 | Groden et al. | |
| 2019/0113918 A1 | 4/2019 | Englard et al. | |
| 2019/0184990 A1 | 6/2019 | Lee et al. | |
| 2019/0311559 A1* | 10/2019 | Bigio | G07C 5/0841 |
| 2019/0346275 A1 | 11/2019 | Kelly et al. | |
| 2019/0383626 A1 | 12/2019 | Fowe et al. | |
| 2020/0005645 A1 | 1/2020 | Wray et al. | |
| 2020/0026279 A1 | 1/2020 | Rhodes et al. | |
| 2020/0125102 A1 | 4/2020 | Jiang et al. | |
| 2020/0217680 A1 | 7/2020 | Dewan et al. | |
| 2020/0249038 A1 | 8/2020 | Nashed et al. | |
| 2020/0310450 A1 | 10/2020 | Reschka et al. | |
| 2020/0346666 A1 | 11/2020 | Wray et al. | |
| 2021/0009161 A1 | 1/2021 | Kim et al. | |
| 2021/0031760 A1 | 2/2021 | Ostafew et al. | |
| 2021/0197852 A1* | 7/2021 | Fairfield | B60W 60/001 |
| 2021/0199442 A1 | 7/2021 | Xie et al. | |
| 2021/0240197 A1 | 8/2021 | Shalev-Shwartz et al. | |
| 2021/0253128 A1* | 8/2021 | Nister | G06N 7/01 |
| 2021/0364305 A1* | 11/2021 | Rizk | G01C 21/3461 |
| 2022/0176995 A1* | 6/2022 | Subramanian | B60W 60/001 |
| 2022/0187083 A1 | 6/2022 | Cohen et al. | |

FOREIGN PATENT DOCUMENTS

| | | |
|---|---|---|
| GB | 2586490 A | 2/2021 |
| JP | 2019096186 A | 6/2019 |
| WO | 2018/115963 A2 | 6/2018 |
| WO | 2018189844 A1 | 10/2018 |

OTHER PUBLICATIONS

Willy Wojsznis, Ashish Mehta, Peter Wojsznis, Dirk Thiele, Terry Blevins, Multi-objective optimization for model predictive control, ISA Transactions, vol. 46, Issue 3, 2007, pp. 351-361.

Altman, E. (1999). Constrained Markov Decision Processes (1sted.). Routledge. https://doi.org/10.1201/9781315140223 (Year: 1999).

T. Weiskircher, Q. Wang and B. Ayalew, "Predictive Guidance and Control Framework for (Semi-)Autonomous Vehicles in Public Traffic," in IEEE Transactions on Control Systems Technology, vol. 25, No. 6, pp. 2034-2046, Nov. 2017, doi: 10.1109/TCST.2016. 2642164. (Year: 2017).

Kubil, Viktor, Vasily Mokhov, and Dmitry Grinchenkov. "Modelling the generalized multi-objective vehicle routing problem based on costs." Proceedings of International Conference on Applied Innovation in IT. vol. 6. No. 1. Anhalt University of Applied Sciences, 2018. (Year: 2018).

Xin L, Kong Y, Li SE, et al. Enable faster and smoother spatiotemporal trajectory planning for autonomous vehicles in constrained dynamic environment. Proceedings of the Institution of Mechanical Engineers, Part D: Journal of Automobile Engineering. 2021;235 (4): 1101-1112. (Year: 2020).

* cited by examiner

LEARNING IN LANE-LEVEL ROUTE PLANNER

TECHNICAL FIELD

This disclosure relates generally to route planning, and more particularly to lane-level route planning for autonomous vehicles.

BACKGROUND

Route planning applications and systems (collectively, route planners) may be onboard vehicle systems or in handheld devices. The user (e.g., a driver) provides a destination and the routing application calculates a route from a current location of the user to the destination.

The route may be overlaid on a map and may include (e.g., show, etc.) the roads and turns that the user can follow to arrive at the destination. That is, the route can include turn-by-turn instructions to the destination. The route typically includes the roads and the turns and it is up to the user (e.g., driver) to decide what lane of a particular road the driver drives on and when to switch lanes, such as to take an exit or turn at an intersection.

Traditional route planners may warn/notify the user that a turn (e.g., an exit) is coming up within a certain distance (e.g., 2 miles), and it is up to the user to decide how to maneuver from a current lane to make the turn. Such route planners do not know which lane the host vehicle is in and by merely notifying the user within the certain distance, the user may be forced to make unsafe maneuvers to move from a current lane to the turn location.

Such route planning applications may deterministically plan at the road level and do not take into account lane-level information/planning. They may model route planning as a classical planning problem that attempts to minimize the route time.

At least for these reasons, road-level, instead of lane-level, route planning may not be appropriate (e.g., sufficient) for autonomous driving because the planning map in such route planning applications may be at a level of abstraction above what is required for autonomous driving where a driver may not be involved at all or, at best, minimally involved.

SUMMARY

A first aspect is a method for lane-level route planning. The method includes obtaining lane-level information of a road, where the road includes a first lane and a second lane and the lane-level information includes first lane information related to the first lane and second lane information related to the second lane; converting the lane-level information to probabilities for a state transition function; receiving a destination; and obtaining a policy as a solution to a model that uses the state transition function.

A second aspect is an apparatus for lane-level route planning. The apparatus includes a processor that is configured to obtain lane-level information of a road, where the road includes a first lane and a second lane and the lane-level information includes first lane information related to the first lane and second lane information related to the second lane; and convert the lane-level information to a state transition function that is used to obtain a route to a destination.

A third aspect is a non-transitory computer-readable storage medium that includes executable instructions that, when executed by a processor, facilitate performance of operations. The operations include operations to receive from vehicles traversing a road respective lane-level information; obtain a navigation map from the lane-level information, where the navigation map includes a state transition graph and a reward function, a lane-level information includes at least two of environment information, vehicle information, or human information; and transmit the navigation map to a vehicle, which uses the navigation map to obtain lane-level routes.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
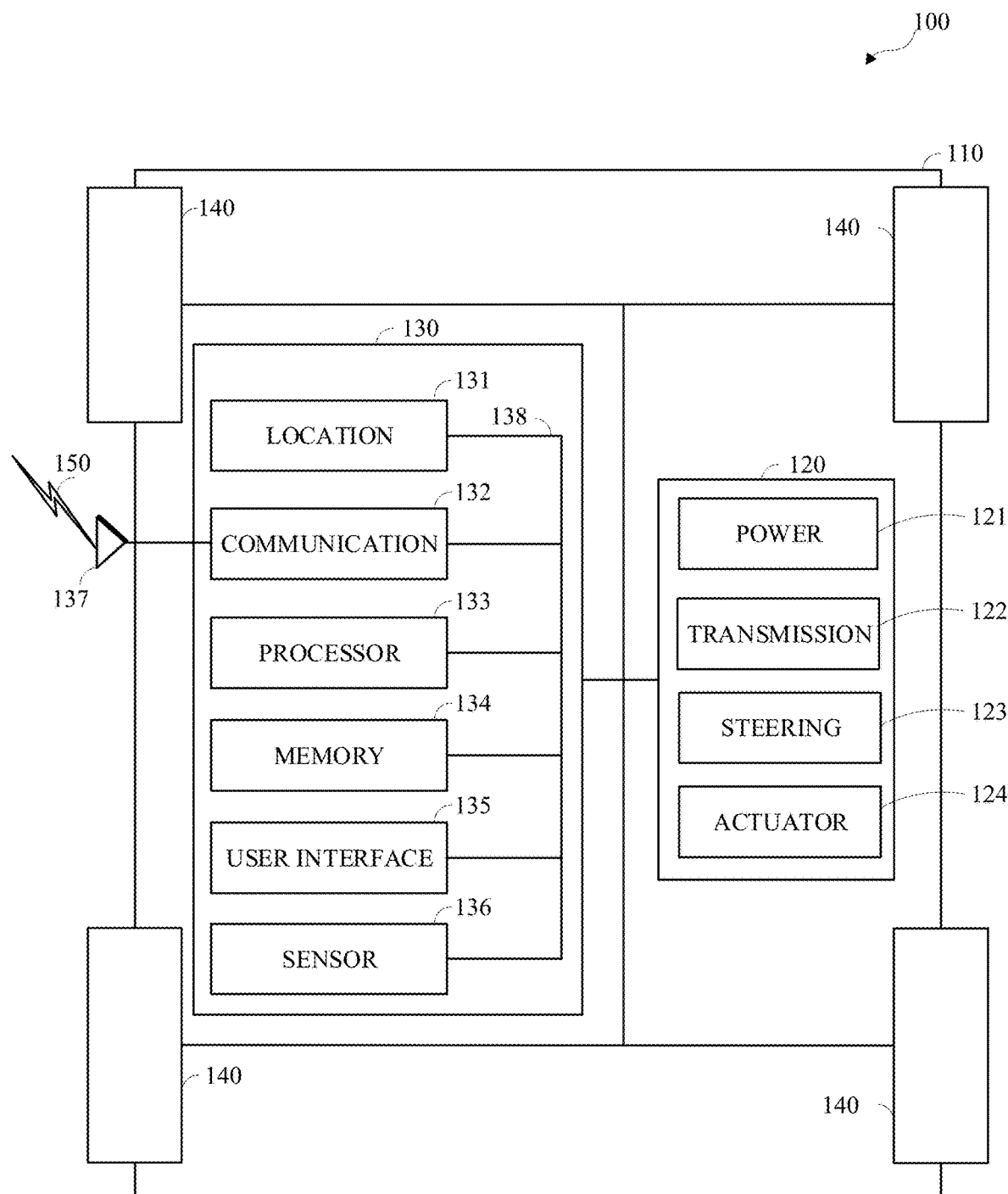
FIG. 1 is a diagram of an example of a vehicle in which the aspects, features, and elements disclosed herein may be implemented.

As mentioned above, route planners typically provide a route without any lane information. Such routes may be planned based on a connected graph of global positioning system (GPS) coordinates and cannot be used for autonomous driving because they are far too abstract. Autonomous driving requires lane-specific information to make lane changes and decisions and plan for contingencies when failures to follow the route occur for whatever reason. In traditional route planner maps, the topology, connectivity, and lane information are typically not available. Autonomous driving, as used herein and unless the context indicates otherwise, encompasses performing vehicle travel control for automatically running a host vehicle in a way as compared to manual control, such as by a human driver or a tele-operator.

Furthermore, such route planner may typically solve for only one objective: time. That is, they perform classical route planning by minimizing a time it takes to reach a destination. Some route planners may allow the user to specify a preference for road types (e.g., highway roads instead of rural roads, toll-free roads instead of toll roads).

However, autonomous driving requires route planning using different (e.g., more) criteria, constraints, and/or objectives.

To illustrate using a simple example, in the case of traditional route planners, when a driver does not make an expected turn or take an exit, the route planner typically performs a "re-routing" operation, which takes at least several seconds to complete, to identify an alternate route. In the case of autonomous driving, and assuming that, due to congestion, an autonomous vehicle (AV) was not able to take an exit, it would not be acceptable for the AV to stop in place until the routing application identifies an alternate route (i.e., re-routes) or to pass a contingency route while it is performing the re-routing operation.

Rather, a route planner according to this disclosure can pre-plan for all contingencies. The contingencies can be incorporated into a policy, as further described below. In an example, the contingencies can be planned taking into account prior probabilities. The probabilities can be based on historical data of lane segment traversals. The probabilities can include probabilities succeeding lane changes, probabilities of failing to make lane changes based on traffic, probabilities of traffic histories, or other probabilities. The lane-level route planner can also plan routes based on levels of competence of autonomous driving on different roads or road segments. Competence is further described below. The route planner can also determine (e.g., plan) the transfer of control between autonomous driving, a driver, and/or a tele-operator. The lane-level route planner uses a navigation map that incorporates the probabilities.

To reiterate, a route planner according to this disclosure determines a lane-level route to a destination including locations along the route where the AV is to controlled to make lane changes. That is, lane changes and, possibly, failures along the route can be planned by the route planner. Additionally, the route planner can have a contingency plan for all possible routes to the goal (e.g., a destination) instead of just obtaining a deterministic plan that assumes success and failure and minimizing some cost (e.g., time to the destination).

Real-world deployment of autonomous vehicles may need to balance several objectives at the same time. The several objectives can include time to destination, desired user comfort (e.g., bumpy vs. smooth roads), desired user road speed, road navigation ability (e.g., whether the vehicle is competent to traverse the road or lane), transfer points among geo-fenced areas, and/or other objectives. In the case of electric or hybrid-electric vehicles, additional objectives can relate to battery efficiency and/or stop points for recharging. Lane-level route planning according to this disclosure can perform such multi-objective planning.

In aspects of this disclosure, the navigation map including lane-level information can be learned. The navigation map can then be used to generate lane-level routes.

Traditional autonomous vehicle route planners may not learn with regards to multiple state features or objectives. Contrastingly, in lane-level route planning according to implementations of this disclosure, a navigation map can incorporate, with respect to lane segments of a lane of a road and via learning, at least some of environment information, vehicle information, human information, fewer, more, other information, or a combination thereof, as further described herein.

As the risk-aware multi-objective lane-level route planning described herein reasons in a space of multi-objectives for autonomous and connected vehicles, customized learning tailored for the stochasticity in each lane, as well as the specific delineated objective reward values, are required and are described herein.

Learning with multi-objectives can be advantageous over single-objective learning at least because more concerns can be considered by the lane-level route planner, which can make automated driving more adaptable than single objective planners. When multiple objectives are possible, the lane-level route planner can learn (or can be taught by a user) about good (e.g., desirable, comfortable, etc.) routes, traffic patterns, user preferences, competence, and so on. For example, the user can directly encode a preference in an exact corresponding objective.

Further details of lane-level route planning are described herein with initial reference to an environment in which it can be implemented.

FIG. 1 is a diagram of an example of a vehicle in which the aspects, features, and elements disclosed herein may be implemented. In the embodiment shown, a vehicle 100 includes various vehicle systems. The vehicle systems include a chassis 110, a powertrain 120, a controller 130, and wheels 140. Additional or different combinations of vehicle systems may be used. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

The powertrain 120 shown by example in FIG. 1 includes a power source 121, a transmission 122, a steering unit 123, and an actuator 124. Any other element or combination of elements of a powertrain, such as a suspension, a drive shaft, axles, or an exhaust system may also be included. Although shown separately, the wheels 140 may be included in the powertrain 120.

The power source 121 includes an engine, a battery, or a combination thereof. The power source 121 may be any device or combination of devices operative to provide energy, such as electrical energy, thermal energy, or kinetic energy. In an example, the power source 121 includes an engine, such as an internal combustion engine, an electric motor, or a combination of an internal combustion engine and an electric motor, and is operative to provide kinetic energy as a motive force to one or more of the wheels 140. Alternatively or additionally, the power source 121 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 receives energy, such as kinetic energy, from the power source 121, transmits the energy to the wheels 140 to provide a motive force. The transmission 122 may be controlled by the controller 130, the actuator 124, or both. The steering unit 123 may be controlled by the controller 130, the actuator 124, or both and control the wheels 140 to steer the vehicle. The actuator 124 may receive signals from the controller 130 and actuate or control the power source 121, the transmission 122, the steering unit 123, or any combination thereof to operate the vehicle 100.

In the illustrated embodiment, the controller 130 includes a location unit 131, an electronic communication unit 132, a processor 133, a memory 134, a user interface 135, a sensor 136, and an electronic communication interface 137. Fewer of these elements may exist as part of the controller 130. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 is operatively coupled with one or more of the location unit 131, the memory 134, the electronic communication interface 137, the electronic communication unit 132, the user interface 135, the sensor 136, and the powertrain 120. For example, the processor may be operatively coupled with the memory 134 via a communication bus 138.

The memory 134 includes any tangible non-transitory computer-usable or computer-readable medium, capable of, for example, containing, storing, communicating, or transporting machine readable instructions, or any information associated therewith, for use by or in connection with any processor, such as the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 is configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 includes a dedicated short range communications (DSRC) unit, an on-board unit (OBU), or a combination thereof.

The location unit 131 may determine geolocation information, such as longitude, latitude, elevation, direction of travel, or speed, of the vehicle 100. In an example, the location unit 131 includes a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include both an audio interface for performing audio communication with a person and a touch display for performing visual and touch-based communication with the person. The user interface 135 may include multiple displays, such as multiple physically separate units, multiple defined portions within a single physical unit, or a combination thereof.

The sensors 136 are operable to provide information that may be used to control the vehicle. The sensors 136 may be an array of sensors. The sensors 136 may provide information regarding current operating characteristics of the vehicle 100, including vehicle operational information. The sensors 136 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 100.

The sensors 136 include one or more sensors 136 that are operable to obtain information regarding the physical environment surrounding the vehicle 100, such as operational environment information. For example, one or more sensors may detect road geometry, such as lane lines, and obstacles, such as fixed obstacles, vehicles, and pedestrians. The sensors 136 can be or include one or more video cameras, laser-sensing systems, infrared-sensing systems, acousticsensing systems, or any other suitable type of on-vehicle environmental sensing device, or combination of devices, now known or later developed. In some embodiments, the sensors 136 and the location unit 131 are combined.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel that is pivoted to a steering angle under control of the steering unit 123, a propelled wheel that is torqued to propel the vehicle 100 under control of the transmission 122, or a steered and propelled wheel that may steer and propel the vehicle 100.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 130 may include the autonomous vehicle control unit.

When present, the autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network information representing the vehicle transportation network, or a combination thereof, and may control or operate the vehicle 100 to traverse the vehicle transportation network in accordance with the route. For example, the autonomous vehicle control unit may output the route of travel to the trajectory controller to operate the vehicle 100 to travel from the origin to the destination using the generated route.

Figure 2:
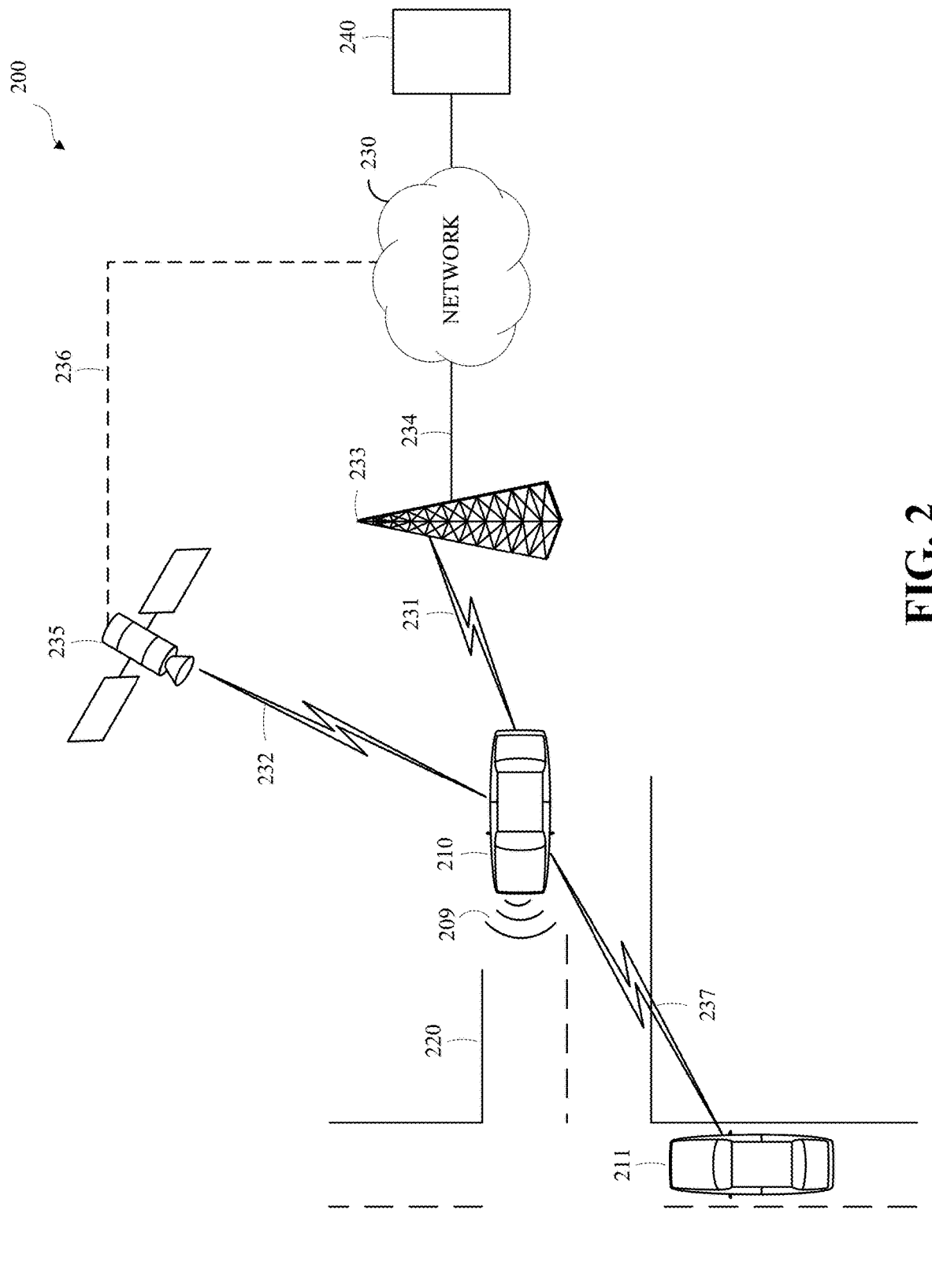
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which travels via one or more portions of the vehicle transportation network 220, and communicates via one or more electronic communication networks 230. Although not explicitly shown in FIG. 2, a vehicle may traverse an off-road area.

The electronic communication network 230 may be, for example, a multiple access system that provides for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. As shown, a vehicle 210/211 communicates via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, an ultraviolet (UV) link, or any link capable of providing for electronic communication.

A vehicle 210/211 may communicate with another vehicle 210/211. For example, a host, or subject, vehicle 210 may receive one or more automated inter-vehicle messages, such as a basic safety message (BSM), from a remote, or target, vehicle (RV) 211, via a direct communication link 237, or via a network 230. The remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, is configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 210 may communicate with the communications network 230 via a satellite 235, or other non-terrestrial communication device. The satellite 235, which may include a computing device, is configured to communicate with a vehicle 210, with a communication network 230, with one or more communication devices 240, or with a combination thereof via one or more communication links 232/236. Although shown as a single unit here, a satellite may include any number of interconnected elements.

An electronic communication network 230 is any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 210 may identify a portion or condition of the vehicle transportation network 220. For example, the vehicle includes at least one on-vehicle sensor 209, like the sensor 136 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220.

The vehicle 210 may traverse a portion or portions of the vehicle transportation network 220 using information communicated via the network 230, such as information representing the vehicle transportation network 220, information identified by one or more on-vehicle sensors 209, or a combination thereof.

Although FIG. 2 shows one vehicle transportation network 220, one electronic communication network 230, and one communication device 240, for simplicity, any number of networks or communication devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

Figure 3:
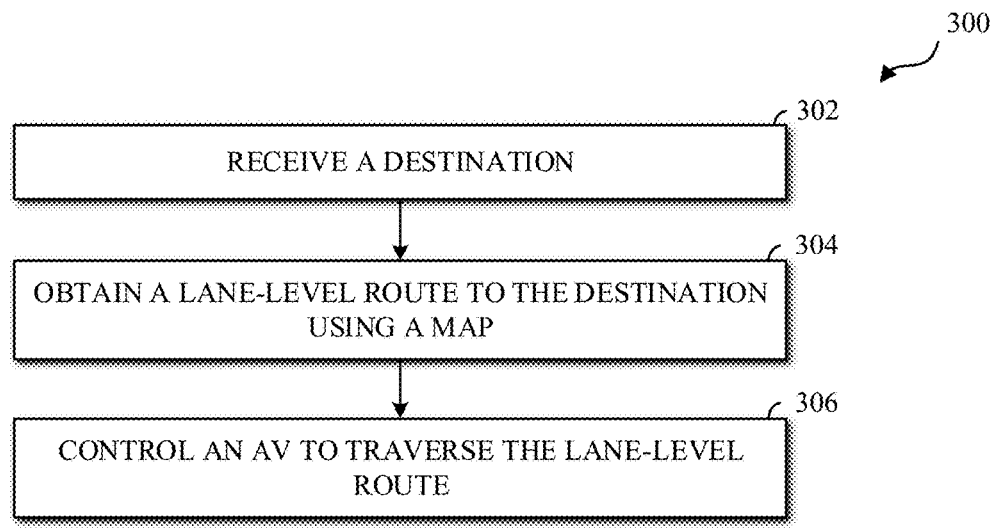
FIG. 3 is a flowchart diagram of an example of a technique for route planning in accordance with an embodiment of this disclosure.

FIG. 3 is a flowchart diagram of an example of a technique 300 for route planning in accordance with an embodiment of this disclosure. The technique 300 can be partially or fully implemented in a host vehicle, which can be the vehicle 100 shown in FIG. 1, one of the vehicles 210/211 shown in FIG. 2, a semi-autonomous vehicle, any other vehicle that may include drive-assist capabilities, or a vehicle that is manually controlled, such as by a driver. The technique 300 can be implemented as instructions (e.g., operations) that are stored in a memory, such as the memory 134 of FIG. 1. The instructions can be executed by a processor, such as the processor 133 of FIG. 1. The technique 300 can be implemented using specialized hardware or firmware. Multiple processors, memories, or both, may be used.

The technique 300 can be implemented partially or fully by a lane-level route planner. The lane-level planner can be implemented using a processor including a CPU (central processing unit), memory, and an input-output unit, such as described with respect to FIG. 1. A computer program that causes the processor to function as the lane-level route planner can be installed into and executed by the processor. This allows the processor to function as the lane-level route planner. Note that although here an example in which the lane-level route planner is implemented by software will be described, as a matter of course the lane-level route planner can be implemented by dedicated hardware prepared for executing each information process to be described herein.

At 302, the technique 300 received a destination. In an example, a user (e.g., a driver) can provide the destination via a user interface of the routing application. In an example, the user can provide the destination to a routing application, which may be executing on a portable device of the user. In another example, the vehicle may be performing a service (e.g., a robo-taxi service) and a the destination may be provided to the technique 300 via a dispatch process, which causes the vehicle to travel to the destination, which may be pick up location of a customer or package or a drop off location of the customer or package. Other ways of providing the destination to the technique 300 are possible. The destination may be an address, a landmark, a venue, or other destination type. The technique 300 can convert the received destination into a set of GPS coordinates.

At 304, the technique 300 obtains a lane-level route to the destination using a map (i.e., a navigation map or lane-level navigation map). The lane-level route includes a transition (i.e., an action to transition) from a first segment of a first lane of a road to a second segment of a second lane of the road. In an example, the destination may be (wirelessly) provided transmitted to a server (e.g., a cloud-based server), such as the communication device 240 of FIG. 2, which calculates the lane-level route. An example of the map and the lane-level route are described with respect to FIG. 4.

Figure 4:
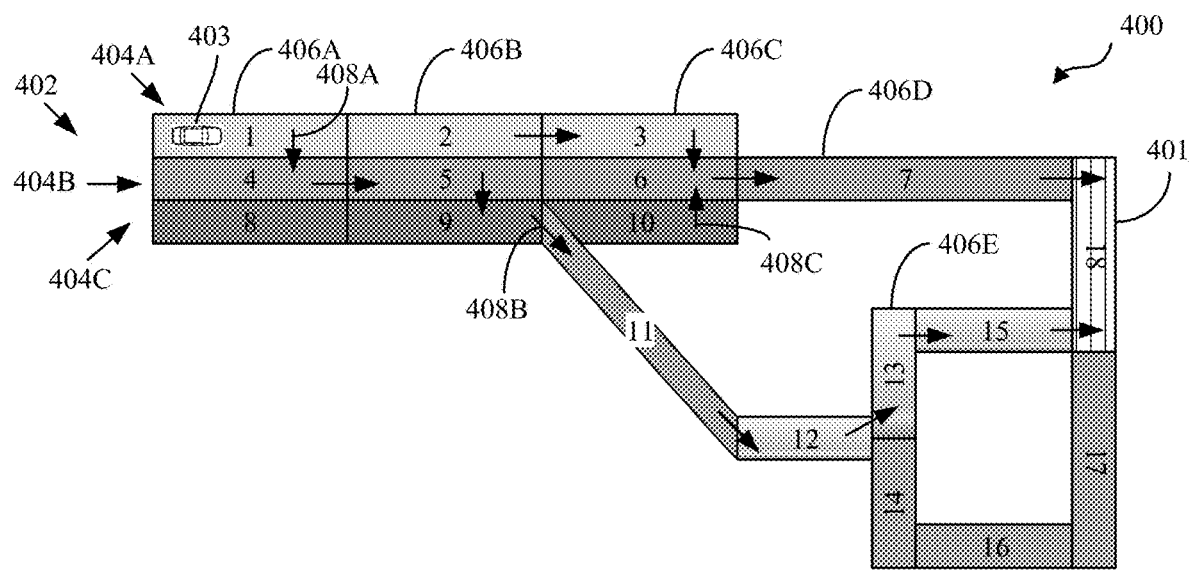
FIG. 4 is an illustration of an example of a map according to implementations of this disclosure.

FIG. 4 is an illustration of an example of a map 400 according to implementations of this disclosure. The map 400 illustrates that the destination is at a road segment 401. The map 400 includes a road 402 that includes three lanes, lanes 404A-404C. Lanes of the map 400 are partitioned into lane segments. The lane segments are indicated by the numbered segments in the map 400. For example, the lane 404A includes the lane segments 406A-406C. A vehicle 403 is currently in the lane segment 406A and is on its way to the destination at the lane segment 401. The lane segment 406A may be an intermediate lane segment between a starting point (not shown) of the vehicle 403 and the destination.

In an example, all road segments can have the same length (e.g., 100 meters, 200 meters, or some other segment length). In an example, at least some of the lane segment lengths can depend on the speed along the road of the lane segment. For example, at high speeds, the lane segments may have longer lengths, such as 500 meters. In an example, lengths of some of the lane segments can be adjustable. That is, for example, when generating a first lane-level route, the first lane-level route may be generated with some of the lane segments having a first length; and when generating a second lane-level route, the second lane-level route may be generated with the some of the lane segments having a second length. The lane segment lengths can be varied based on speed on a road, time of day (e.g., rush hour vs. weekend), socio-geographic region (e.g., school zone, residential neighborhood), weather (e.g., sunny vs. snowy), road type (e.g., freeway vs. urban road), more, fewer, other criteria, or a combination thereof. For example, and as is visually illustrated, the lane segment 406E is shorter than the lane segment 406C; but the lane segment 406D is longer than the lane segment 406C.

In the map 400, lane segments can have identification numbers (IDs). For example, the lane segments 406A-406E have, respectively, the IDs 1, 2, 3, 7, and 13. At least some of the lane segments can be associated with metadata. In an example, the metadata can include one or more classifications (e.g., designations). For example, the map 400 illustrates (using different shadings) that the lane segments with IDs 1, 2, and 3 are high-speed segments; that the lane segments with IDs 4, 5, 6, 7, and 11 are normal speed (e.g., speed limit) segments; that the lane segments with IDs 8, 9, and 10 are comfortable (e.g., lower speed) segments; that the lane segments with IDs 12, 13 and 15 are urban lane segments; and that the lane segments with IDs 14, 16 and 17 are manual-driving lane segments. These classifications are not necessarily mutually exclusive. For example, an urban lane segment can be a manual-driving lane segment.

A comfortable lane segment can be a lane segment where traffic may move at speeds that are within −10 (or some other threshold speed) miles per hour of the speed limit on the road of the lane segment. A manual-driving lane segment is a lane segment that cannot be autonomously traversed, or cannot be autonomously traversed with a sufficient degree of confidence. Such a lane segment has to be traversed under manual driving control, such as by a driver or a tele-operator. As such, the lane-level route planner can also include actions for notifying a user (e.g., a driver) a certain time ahead of the lane segment that the user should assume manual driving control of the vehicle.

In an example, obtaining the lane-level route can include obtaining a policy for traversing the lane segments from a source location to the destination. The policy includes lane transitions. More accurately, and as further described below, the policy provides actions given that the vehicle is in a current lane segment. In an example, the policy can be a deterministic policy. In another example, the policy can be based on a stochastic model.

While in route planning, minimizing time to destination is usually an objective of the route planner, the lane-level route planner according to this disclosure can obtain a lane-level route by optimizing for several objectives, as further described below.

The lane-level route can be obtained using a type of Markov Decision Process (MDP) model. Lane-level route planning can be modeled as topological partially observable Markov decision process (TPOMDP) or its fully observable subclass topological Markov decision process (TMDP). TPOMDPs and TMDPs allow for additional objective measures, such as maximizing safety, smoothness, and/or other human preferences, to be incorporated into a typical partially observable Markov decision process (POMDP) or Markov decision process (MDP) objective, such as minimizing time or distance traveled. Solving a TPOMDP model may be similar to solving the TMDP model, except that the TPOMDP is based on belief states (i.e., probabilities), representing probabilities for respective states and subject to observation probabilities corresponding to generating observations for respective states. Other model types are also possible. For example, the model can be one of a scalarized multi-objective Markov decision process (MOMDP), a scalarized partially observable multi-objective Markov decision process (MOPOMDP), a constrained Markov decision process (CMDP), or a constrained partially observable Markov decision process (CPOMDP).

To illustrate, and without loss of generality, the user may indicate a preference for slow lanes. As such, the route planner can integrate a "comfort" objective into its calculation of how to get to the destination. In another example, the user can additionally, or alternatively indicate a preference for lanes that minimize energy consumption. For example, if traffic on some lane segments is stop-and-go, which tend to require more energy consumption, then the route planner may prefer other road segments to them. As another example, a smooth road would be preferred by the route planner over roads with many ups and downs because such roads tend to result in more energy consumption. In another example, a road with many charging stations may be preferred over another road with sparse charging stations.

Without loss of generality, the model (e.g., TMDP or TPOMDP) can be described with stochastic shortest path (SSP) structure terminology (e.g., costs instead of rewards and goals as target states that self-loop upon arrival).

A connectivity graph (V, E, R) can be converted into a model represented by a tuple $\langle S, A, T, C, E, \delta, s_0, s_g \rangle$. Each vertex $v \in V$ can be a GPS coordinate for a point where a routing decision can be made. As such, a vertex can be the GPS coordinate of an intersection, of a lane change location (such as, for example, from the lane segment with ID 9 to the lane segment with ID 11), of a merge point, and so on. To illustrate, in the map 400, the vertices θ can be the coordinates of certain points of the lane segments. For example, the certain points can be the mid-points of the lane segments. Each edge $e \in E$ of the connectivity graph can describe the directed graph of vertices for lengths or traversal time R(e). For example, in the connectivity graph underlying the map 400, the vertex corresponding to the lane segment with ID 9 would be connected to the lane segments with ID 10 and 11.

An overview of the formal model TMDP is now presented. As mentioned, the model can be formally described as a tuple $\langle S, A, T, C, E, \delta, s_0, s_g \rangle$. S can be a finite set of states or vertices $v \in V$. A is the action space at each vertex for choosing successor lane segment (or, equivalently, a successor vertex). To illustrate, and without loss of generality, the action space A can include the actions "move left," "move right," "go straight," or "move diagonally." However, more, fewer, other actions, or a combination thereof are possible. For example, the action space A can also include an action of notifying the user to assume manual control, an action of switching to manual control, an action notifying the user that control will switch to automated control, an action of switching to automated control, and so on.

$s_0$ is an initial state, which can be a current location of the vehicle at the time that the route planner calculates a lane-level route. $s_g$ can be the goal state, which can be the destination. Once the goal state $s_g$ is reached, the goal state is maintained no matter which action is then taken and every action taken in the goal state $s_g$ has a cost of 0.

T (i.e., T:S×A×S→[0,1]) can be a state transition function that represents the probability that successor state $s' \in S$ occurs after performing an action $\alpha \in A$ in a state $s \in S$. Thus, T is a state transition function that describes the stochastic success/failure of each action. The state transition function $T(s,\alpha,s')=Pr(s'|s,\alpha)$ can be the probability of successor (lane segment or vertex) s' given action α was performed in state s. In an example, the state transition function can include a respective probability for at least some (e.g., each) of the neighboring vertices (e.g., lane segments) of a vertex (e.g., lane segment). To illustrate, with respect to the lane segment with ID 1 (i.e., the lane segment 406A), the state transition function T can include a respective transition probability for some of the transitions from the lane segment with ID 1 to the lane segment with ID 4, the lane segment with ID 1 to the lane segment with ID 2, and/or the lane segment with ID 1 to the lane segment with ID 5. In some examples, the state transition function can include probabilities for transitioning to more distant neighbors (e.g., from the lane segment with ID 1 to the lane segment with ID 3).

As such, obtaining the lane-level route to the destination using the map can include obtaining a policy that, when the AV is on a first lane segment of the map, provides an action for controlling the AV to move to a second lane segment that neighbors the first lane segment.

The probabilities can be derived based on criteria including speed limits, lane lengths of edges e, specifications of the AV, time of day and location, traffic congestion information, more criteria, fewer criteria, other criteria, or a combination thereof. In an example, these probabilities (and/or the criteria used to obtain the transition probabilities) can be learned, as further described below.

$C(s,\alpha)$ (i.e., $C:S \times A \to \mathbb{R}^k$) can represent a multi-cost function that represents the expected immediate cost(s) of performing an action $\alpha \in A$ in state $s \in S$. As such, the lane-level route can be calculated using one or more objectives. The cost C can be modeled as a cost vector of optimization for one or more expected objectives. The one or more expected objectives can include a time objective $C_T$ (i.e., a first objective relating to time of minimizing the travel time to the destination), a comfort objective $C_C$ (i.e., a second objective relating to comfort indicating a preference for comfortable lane segments), an autonomy objective $C_A$ (i.e., a third objective relating to autonomy indicating a preference for lane segments where the vehicle can be autonomously controlled as opposed to manually controlled), an urban objective $C_U$ (i.e., a fourth objective relating to a preference for urban lane segments as opposed to, for example, rural lane segments), fewer objectives, more objectives, other objectives, or a combination thereof. In an example, a cost objective can be related to power generation. Thus, in an example, the cost vector C can be given by $\vec{C}(s,\alpha) = [C_T(s,\alpha), C_C(s,\alpha), C_A(s,\alpha), C_U(s,\alpha), \ldots]^T$, where each $C_i(s,\alpha)$ denotes the cost objective i for being in a state s and performing the action $\alpha$. In an example, the one or more objectives can include at least two of a first objective relating to time, a second objective relating to comfort, a third objective relating to autonomy, or a fourth objective relating to urban lane segments.

The objectives can be arranged in a preference ordering following a directed acyclic graph (DAG) E. Examples of preference ordering graphs are described below with respect to FIG. 5. Each objective can have a non-negative slack $\delta: e \to R+$, describing how much the user is willing to "spend" in the value of one objective to improve the value of another. As such, the one or more objectives are related in a preference ordering including slack variables.

A solution to the model can be a policy $\pi: S \to A$. Under the policy $\pi$, an action $\alpha$ (i.e., $\pi(s)$) is selected for a state s. That is, the policy $\pi$ can indicate that the action $\pi(s) \in A$ should be taken in state s. The policy $\pi$ can include a value function $V^\pi: S \to C$ that can represent the expected cumulative cost $V^\pi(s)$ of reaching the destination (i.e., the goal state $s_g$) from a state s following the policy $\pi$. That is, the value function can provide an expected cost (i.e., a value) for each intermediate state $s_t$, from the start state until the goal state is reached.

An optimal policy, $\pi^*$ minimizes the expected cumulative cost. Formally, for the initial state $s_0$, the expected value can be given by formula (1):

$$V(s_0) = \mathbb{E}\left[\sum_{t=0}^{\infty} C(S_t, A_t) | S_0 = s_0, \pi\right] \quad (1)$$

In formula (1), $S_t$ and $A_t$ denote, respectively, the random variables of the state and action at time step t. In general, solving the model requires that a proper policy exists. A proper policy $\pi$ has the properties: (1) there exists a policy that reaches the goal with probability 1, and (2) all states that do not reach the goal with probability 1 result in an infinite cost.

At 306 of FIG. 3, the technique 300 controls the AV to traverse the lane-level route. Returning to FIG. 4, the arrows in FIG. 4 illustrate the actions under the determined policy $\pi$. An arrow 408A illustrates the action "when the state equals to the lane segment with ID 1, take the action right, which results in the vehicle ending in the state equals to the lane segment with ID 4." "Take the action" in this case means "cause the vehicle to be controlled" such as by changing an operation amount of an accelerator pedal, an operation amount of a brake pedal, changing the steering angle of a steering wheel, or the like.

The determined policy $\pi$ incorporates (e.g., includes) contingency routes. Thus, the obtained the lane-level route includes a contingency route. To illustrate, when the vehicle is in the lane segment with ID 9, the policy indicates that the vehicle is to be controlled to move to the lane segment with ID 11. However, should the vehicle not be able to take the lane segment with ID 11 and end up in the lane segment with ID 10, then the policy indicates a "take the action left" to move the vehicle to the lane segment with ID 6 and unto the lane segment with ID 7. As such, controlling the AV to traverse the lane-level route can include, in response to an inability to transition from the first segment to the second segment, controlling the AV according to the contingency route.

Figure 5:
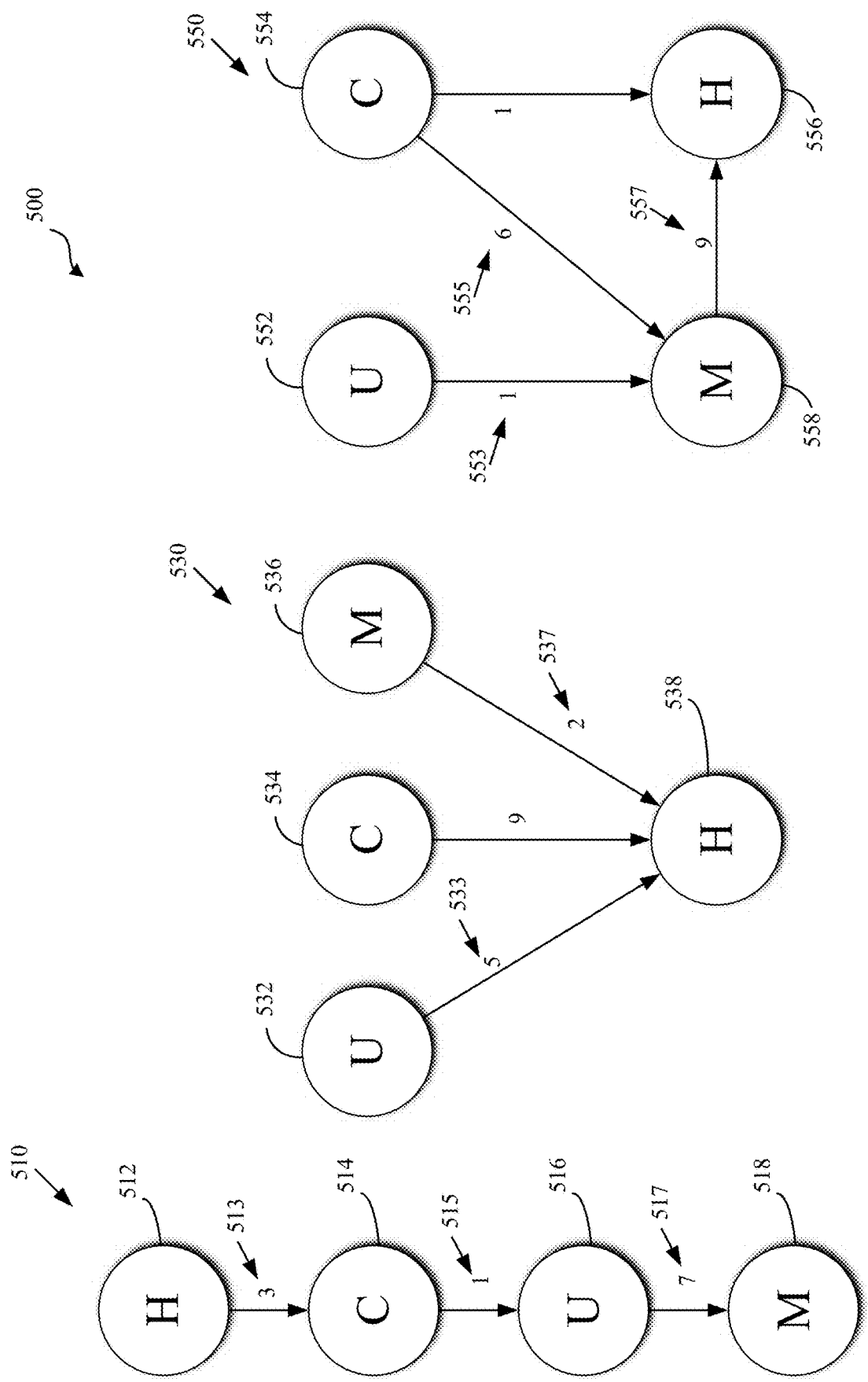
FIG. 5 illustrates examples of preference ordering graphs of objectives according to implementations of this disclosure.

FIG. 5 illustrates examples 500 of preference ordering graphs of objectives according to implementations of this disclosure. As mentioned above, the objectives of the model can be topologically ordered. The topologically ordered constraints can subject predecessor objectives to satisfying slack at the initial belief or across all beliefs. The lane-level route planner can reason about the objectives to calculate the policy, which are ordered in a topologically-ordered constraints graph. While three different preference orders are described, the disclosure is not so limited and other configurations (i.e., preference orders) are possible.

The objectives illustrated in the examples 500 relate to optimizing speed (i.e., the bubbles labeled H, such as objectives 512, 538, and 556), optimizing comfort (i.e., the bubbles labeled C, such as objectives 514, 534, and 554), optimizing urban driving (i.e., the bubbles labeled U, such as objectives 516, 532, and 552), and optimizing manual driving (i.e., the bubbles labeled M, such as the objectives 518, 536, and 558). The objectives illustrated are examples and other objectives are also possible. Furthermore, the illustrated preference ordering graphs are non-limiting examples and other preference ordering graphs including the same, or different objectives, and topologies are also possible. Each of these objectives is associated with a respective semantic label that can be meaningful to a human. As further described herein, users can use the semantic labels to indicate route preferences for the lane-level route planner.

An example 510 is an example of a chain preference ordering graph. When the preference ordering graph of the example 510 is used (i.e., when the objectives are related in a chain), the first high-speed objective is maximized (i.e., the objective 512); then the comfort objective (i.e., the objective 514) is maximized provided it is within a slack 513 (e.g., a slack of 3) of the high-speed objective; then the urban objective (i.e., the objective 516) is maximize provided it is within a slack 515 (e.g., a slack of 1) of the comfort objective, which was already constrained to guarantee it is within the slack 513 of the first objective; and lastly, the manual-driving objective (i.e., the objective 518) is maximized is maximize provided it is within a slack 517 (e.g., a slack of 7) of the urban objective, which was already constrained.

The example 510 can be interpreted (e.g., understood, etc.) as that the lane-level route planner preferring high speed roads (i.e., the objective 512) but would allow for a three-minute extra time (i.e., the slack 513) in order for the route planner to choose a different alternate route that is more comfortable (i.e., the objective 514)—the alternate route would also maximize the comfort objective. As such, a user may provide an input (e.g., issue a command, etc.) that essentially states "get me the fastest possible road, but allow for routes that are 3 minutes longer than the fastest in order to drive on more comfortable lanes." And similarly for the other objectives in the example 510. It is to be noted that the unit of measure of a slack variable is the same as the unit of measure of the objective it constrains.

As will be further described below, a user can specify the ordering of the objective with a verbal command that the route planner can convert to a preference ordering graph, via a graphical user interface (e.g., a drag-and-drop interface, a list, etc.), or some other way for the user to provide the preferences.

An example 530 is an example of a fan preference ordering graph. When the preference ordering graph of the example 530 is used (i.e., when the objectives have this fan-like relationship), the optimal policy is simultaneously computed for the urban objective (i.e., the objective 532), the comfort objective (i.e., the objective 534), and the manual driving objective (i.e., the objective 536). The final policy is then determined that maximizes the high-speed objective (i.e., the objective 538), subject to the slacks 533, 535, and 537 (i.e., the slack values 5, 9, and 2, respectively) of the three first objectives. This is equivalent to taking the intersection of the policy sets of the first three objectives and searching that space for the last objective.

An example 550 is an example of a directed graph that is a mixture of the examples 510 and 530.

For each objective (e.g., a bubble of the examples 500), the lane-level route planner obtains a set of routes that satisfy that objective. For example, with respect to the objective 552, the lane-level route planner identifies the optimal route (e.g., the minimum route to get to the destination on as many urban lanes as possible). One minute of slack (i.e., a slack 553) is allowed in order to get to the goal. As such, the route planner can be thought of as providing an envelope of possibilities around getting to the goal. That is, the route planner can identify all the routes that are within one minute of the most optimal time and whether or not they are on urban roads. Thus, a first set of routes satisfying the objective 552 within the slack 553 is returned.

A second set of routes satisfying the objective 554 (i.e., driving on lanes marked as comfortable) and that are within 6 minutes (i.e., a slack 555) of the most comfortable route. Similarly, a third set of routes satisfying the manual-driving objective to within 9 minutes (i.e., a slack 557) are also obtained; and so on. All the obtained sets of routes are passed to the objective 556 and the route that is then obtained from this sink objective has to be in all of the obtained sets of routes. In some situations, a route satisfying all the constraints and slacks may not be possible.

It is to be noted that an incoming arrow into a bubble in the examples 500 can be thought of as constraining that objective to be within the set (or sets, depending on the configuration of the preference ordering graph) of routes that the objective is given. As such, if there is no parent arrow (i.e., no incoming arrows), any route satisfying the objective within any slacks (if any) can be selected by the route planner. On the other hand, the route(s) selected has(have) to be in route(s) provided by parent objectives. As such, downstream objectives can be thought of as pruning provided (e.g., incoming) set(s) of routes.

In an example, instead of a preference ordering graph, a scalarization function can be used to map (e.g., combine, etc.) all the rewards (e.g., costs) to a single value. The scalarization function can be used to convert the model/problem into a shortest path optimization problem (SSP) MDP or POMDP. A single value indicating the long term utility of a next immediate action can be obtained using the scalarization function, which combines the expected costs to obtain the single value. Formally, the scalarization function $f:C \to \mathbb{R}$ can be such that, with respect to the single value, $f(V(s))=V_f(s)$ and, with respect to the cost functions $f(C(s))=C_f(s)$. In an example, the scalarization function can be a weighted sum of the objectives or a non-linear function of the objectives. Different weights can be used depending on the desired optimization. In an example, lane-level route planning can be modeled as a classical planning (CP) problem by removing any probabilities.

Regardless of the model used, lane-level route planning can be hierarchical. As can be appreciated, the higher the number of possible of lanes, the longer it might take to calculate the policy, if at all. To limit the number of lane segments that the lane-level route planner reasons about, lane-level route planning can be performed in a hierarchical fashion. For example, given a starting location in Miami, Florida and a destination in Fairbanks, Alaska, the lane-level route planner may group the roads of the United States into clusters, plan lane-level routes between clusters, and then perform route-level planning within each of the clusters of the route.

In an example, and as mentioned above, lane-level route planning can be modeled as a topological partially observable MDP (TPOMDP) to allow for a belief over, for example, (1) the level of traffic at each state, (2) the competence of at least one of the driver and/or the vehicle, and/or (3) the various objective costs.

More formally, the TPOMDP can be described as a tuple $\langle S, A, \Omega, T, O, R, E, \delta \rangle$.

S is a finite set of states. A is a finite set of actions. $\Omega$ is a finite set of observations. T is the state transition function such that T(s,a,s')=Pr(s'|s,a) is the probability of successor state s' given action α was performed in state s. O is an observation function such that O(α, s', ω)=Pr(w|α, s') is the probability of observing co given action a was performed resulting in successor state s'.

R is a vector of reward functions, which can be equivalent to the cost vector C described above. As also described above, E is the a set of edges over k rewards (e.g., costs) forming a directed acyclic graph, with one leaf (i.e., sink) reward vertex which, without loss of generality, is reward vertex k. δ is a function mapping edges $e=\langle i,j \rangle \in E$ to a non-negative slack constraint $\delta(e) \geq 0$ or, equivalently, $\delta(i,j) \geq 0$.

The TPOMDP operates over a belief $b \in B \equiv \Delta^{|S|}$ of the world, where $\Delta^{|S|}$ is the probability distribution over states S and is as the standard |S|-simplex. Belief b is a probability distribution over states. Beliefs exist for all time steps and for all forward, backward, successor, predecessor, etc. lane segments. Given belief b, after performing an action α and observing ω, the next belief $b_{b\alpha\omega}$ over state s' is:

$$b_{b\alpha\omega}(s') \propto O(\alpha,s',\omega)\Sigma_{S \in S}T(s,\alpha,s')b(s) \text{ where } \propto \text{ means proportional} \quad (2)$$

As mentioned above, TMDP is a subclass of TPOMDP with $\Omega=S$ and $O(a, s, s')=1$, such that the reachable beliefs $b \in B$ are $b(s)=1$ for all $s \in S$.

The objective in an infinite horizon TPOMDP seeks to maximize the expected discounted reward from an initial belief $b_0$ with discount factor $\gamma \in [0, 1)$. For a policy π, the expected discount reward can be given by $\mathbb{E}[\Sigma_{t=0}^{\infty}\gamma^t C(S_t, A_t)|S_0=s_0,\pi]$ or, equivalently, $\mathbb{E}[\Sigma_{t=0}^{\infty}\gamma^t C(b^t,\pi(b^t))|b^t,\pi]$ with $b^t$ denoting the random variable for the belief at time t generated following the transition function T and the observation function O that is the probability of a particular observation given an action α was performed resulting in successor state s'.

The value $V^\pi:B \to \mathbb{R}$ is the expected reward at belief b can be given by:

$$V^\pi(b)=R(b,\pi(b))+\gamma\Sigma_{\omega \in \Omega}\Pr(\omega|b,\pi(b)))V^\pi(b_{b\pi(b)\omega}') \quad (3)$$

In equation (3), $R(b,\alpha)=\Sigma_s b(s)R(s,\alpha)$ and $b_{b\pi(b)\omega}'$ following the believe update in equation (2).

As mentioned herein, the lane-level route planner obtains a policy using a navigation map. In an example, the navigation map can be learned. Learned as used herein encompasses that the navigation map can be evolved. The navigation map may include pre-configured lane information and, as lane-level information is obtained from one or more vehicles, the pre-configured lane information can evolve to reflect (e.g., incorporate, etc.) the obtained lane-level information. The navigation map may not initially include lane-level information and the lane-level information can be constructed (e.g., populated, etc.) based on the lane-level information received from one or more vehicles.

The lane-level information may be continuously received and the navigation map regularly updated using the newly received lane-level information. The navigation map can be a navigation map of a particular vehicle (e.g., deployed in a particular vehicle) and the navigation map can be updated based on lane-level information from the vehicle itself.

Additionally or alternatively, the navigation map can be learned based on lane-level information received (such as at a server) from many vehicles. The lane-level information can be with a server, which can be a cloud-based server. As such, multiple vehicles can then receive more accurate initial estimates on time (before actually driving on the road), preferences about popular routes (in new areas), and competence information about where the fleet should be planning routes through (for vehicles sharing the same code/hardware).

Lane-level information may be obtained from many vehicles. Vehicles owned by particular customers can generate lane-level information. A deployed fleet of vehicles (such as to provide a taxi service, a delivery service, or some other service) can generate lane-level information. The lane-level information from a vehicle can be generated using data received from sensors of the vehicle. In an example, raw sensor data may be transmitted to the server and the server can generate the lane-level information using the raw sensor data.

As such, the navigation map can include learned historic driving patterns on, and characteristics of, different lanes and different lane segments of different roads. The historic driving patterns can be those of a particular vehicle, of a particular driver of the particular vehicle, or of an aggregated learned historic driving patterns of several vehicles.

The driving patterns of one or more drivers can be learned and used in lane-level route planning. The navigation map can include information about road conditions. Thus, a learned navigation map is one that can leverage/incorporate the history of driving behavior of drivers and/or characteristics of lanes (and more specifically, lane segments) therewith enabling lane-level route planning.

Lane-level information from multiple connected vehicles (such as connected to a cloud-based sever) can be combined into a shared navigation map. Each of the connected vehicles can transmit lane-level information to a server, such as the one or more communication devices 240, which can aggregate all of the obtained lane-level information to obtain the navigation map. Multi-vehicle multi-objective learning (i.e., lane-level information from multiple connected vehicles) can greatly speed up learning for a single vehicle and enables the vehicle to learn the values of routes (e.g., the lane-level information) before ever having driven on the roads themselves.

Over time, the server can receive information about many lane segments that many drivers have driven in an area and not just for a road that a specific vehicle has driven. The lane-level information can also include identifying information of the vehicle platforms (e.g., Nissan LEAF, Nissan Sentra, Nissan Rogue, etc.). In some example, the lane-level information can also include information (e.g., preferences, etc.) of particular drivers for which the lane-level information was generated. Using the received lane-level information traces, the server can then separate that information into those that depend on the vehicle (i.e., vehicle specification), the driving styles, road (e.g., including lane and lane-segment conditions), and/or other criteria to create unique navigation maps that are each specific to a particular vehicle, a particular vehicle platform, a particular driver, particular driving styles, or the like.

As mentioned above, with respect to lane segments of lanes of roads and via learning, at least some of environment information, vehicle information, human information, fewer, more, other information, or a combination thereof can be learned. The learned information can be converted to probabilities. The probabilities can be, can be incorporated in, or can be used by the state transition function, as described herein. The probabilities can also be used in setting objectives for a route (e.g., a policy) to be calculated.

The environment information can include one or more of traffic patterns, pedestrian patterns, traversal difficulties information of lane segments by vehicles (e.g., other AVs), weather information, burden information, more, fewer, other environment information, of a combination thereof. The vehicle information can include one or more of average speed information per lane segment, energy usage (e.g., battery usage for electric vehicles, gasoline and battery usage for hybrid vehicles, or gasoline usage for internal combustion engine vehicles), more, fewer, other vehicle information, or a combination thereof.

The human information can include one or more of preferred routes, preferred lanes, transfer of control requests (such as from automated to manual driving or from manual to automated driving), competence model updates via driver overrides, more, fewer, other human information, or a combination thereof. The transfer of control requests can include the lane segments at which the transfer of control was requested. The transfer of control requests can include a planned successor lane segment and which successor lane segment the human driver took.

As a vehicle is traversing routes (whether based on a current state of a navigation map or without setting a route via the lane-level planner), sensors of the vehicle can be used to collect information to be converted to lane-level information. That is, the vehicle can be thought to be in shadow mode and watching its environment via its sensors.

The data from the sensors can be used to identify, for examples and without limitations, whether roads (and thus, lanes and lane segments) are urban or highways, whether lane segments are difficult to traverse, whether traffic is dense, the level of the density, and so on. Difficulty of traversal can be identified based on the amounts of driver overrides. That is, the number of times that automated driving decisions is overridden or corrected by a human or the number of times that a human directs the automated control to control the vehicle in a different way than that proposed by the automated control.

Burden information can indicate a level of stress that a user (e.g., an occupant of the vehicle) may be subjected to given a selected lane change decision. To illustrate, a particular route may require that the vehicle move left by three lane segments within a relatively short period of time or short distance in a congested or high speed traffic area. Such a situation can be stressful to the user. Such burden information may be used to select lane segment transition points that are far earlier in advance of the congestion areas or to select a route that avoids the stressful situation altogether.

The lane-level information can be used to perform counting so that the counts may be converted to the probabilities. For example, and without loss of generality, a count of the density of traffic can be converted into a probability of moving from one lane segment to another, such as the time it takes to traverse one lane segment in a road and move to the next lane segment; a count of the number of times in the history that there has been light traffic vs. dense traffic on a lane segment can be used to determine a probability of traffic density; a count of the number of times that the speed on a lane segment is high can be used to classify a lane segment as being high speed; a count of the number of times that speed on a lane segment was within −10 miles of the speed limit can be used to determine a probability of the lane segment being a comfortable lane segment; and so on.

The navigation map can be built from the probabilities. That is, the navigation map can incorporate the probabilities. The navigation map is the transition graph as described with respect to FIG. 4. In obtaining a policy, a next action (e.g., move straight to the next lane segment, move to the left-neighboring lane-segment, etc.) can be determined based on the lane-level information (e.g., probabilities). To illustrate and without loss of generality, the next action can be determined probabilistically (or deterministically) based on the probabilities of the neighboring lane segments described herein including, for example, the probabilities of the neighboring lane segments being congested based on whether the current lane segment is congested or not.

At least some of the lane-level information of the navigation map can be used to set objectives for the lane-level route planner. To illustrate and without limitations, as mentioned, the environment can include traversal difficulties and when an objective is (such as set by a user) to maximize automated driving, then the route planner would avoid lane (or lane segments) with traversal difficulties. That is, the route planner policy would be calculated so as to avoid lane segments with traversal difficulties.

Consider the objectives for time to destination (which can include or incorporate speed limit, road length, stop lights, traffic density, whether lane segment are high speed lanes, and the like), preference (which can include a user preference for at least some of comfort, urban as opposed to highway roads, energy consumption, and the like), and competence (which can include whether lane segments can be competently automatically traversed or competently manually traversed).

To illustrate and without limitations, to be able to plan routes using at least a subset of the time, preference, and competence objectives, whenever a vehicle drives on a route, the times to automatically traverse particular lane segments can be recorded with and without full stops. Similarly, the times to manually traverse (i.e., when a human drives on) the particular lane segments can also be recorded. As such, four average time durations can thus recorded. The average times can be used to define the TMDP state transitions for self-looping (stops). The average times can be used to define the rewards/costs for traversal time, such as based on state: automated driving (e.g., control) vs. manual driving.

Additionally, whenever the human drives on a lane segment, successor lane segments can be recoded. The successor lane segments can be used to define the rewards/costs for the preference in the range of [0, 1], which can be the ratio of times that the human drove a road or lane segment.

Furthermore, whenever the human overrides the automated control or the vehicle, under automated control, gets stuck (i.e., does not advance in more than a first threshold of time, such as 1 minute or some other threshold of time, then a first value of −1 can be recoded; otherwise (e.g., when the automated control is not overridden and the vehicle does not get stuck), a second value of 0 can be recorded. The average of the recoded first values and second value can be used as a measure of the competence. The converse can be used to learn the human driver's competence. For example, under manual control, if the vehicle does not move in more than a second threshold of time (e.g., 1 minute or some other threshold of time), then a third value of −1 can be recorded. For example, if the driver does not follow a proscribed next action that is identified by the lane-level route planner, then a fourth value of −1 can be recorded. For example, if the driver seamlessly proceeds to a neighboring lane segment, then a fifth value of 0 can be recorded. An average of the third, fourth, and fifth values can be recorded as a measure of the competence of a human to take a next action when the vehicle is at current lane segment.

As already mentioned, semantics labels can be used to define objectives for a route to be calculated by the lane-level route planner. Examples of semantic labels include those described with respect to FIG. 5 such as "comfort" (and/or any related semantic concept), "urban" (and/or any related semantic concept such as "highway"), "high speed" (and/or any related semantic concept), "manual driving" (and/or any related semantic concept such as "automated driving"). Fewer, more, other semantic labels, or a combination thereof are possible. To illustrate, if the user indicates a preference for comfortable roads, then the lane-level route planner would calculate a policy considering the lane segments labeled "comfortable."

It is noted that there the mapping from objective to semantic label need not be a one-to-one mapping. As such, a semantic label may combine several objectives or a one objective may be used to define one or more semantic labels.

In an aspect of the disclosed implementations, use multi-objective deep reinforcement learning (MODRL) can be used. In reinforcement learning or deep reinforcement learning, a deep neural network (DNN) can be used to learn the policy. The DNN can be alternatively or additionally used to learn the value functions. As such, reinforcement learning techniques can be used instead of planning techniques. In reinforcement learning, the objectives can be learned via the DNN from feedback. The feedback can include one or more of the time to traverse a lane segment, human overrides for competence, or other feedback. In reinforcement learning, instead of learning the probabilities, the probabilities and the costs are combined into the expected values of getting to the goal (i.e., a destination).

In an aspect, and as described herein, a TMDP can use the navigation map to obtain a policy. In another aspect, a TPOMDP can be used to obtain the policy. Using a TPOMDP enables a belief over, for example and without limitations, the level of traffic on a road, lane, or lane segment; the amount of competence for a new road, lane, or lane segment; or other lane-level information described herein.

Figure 6:
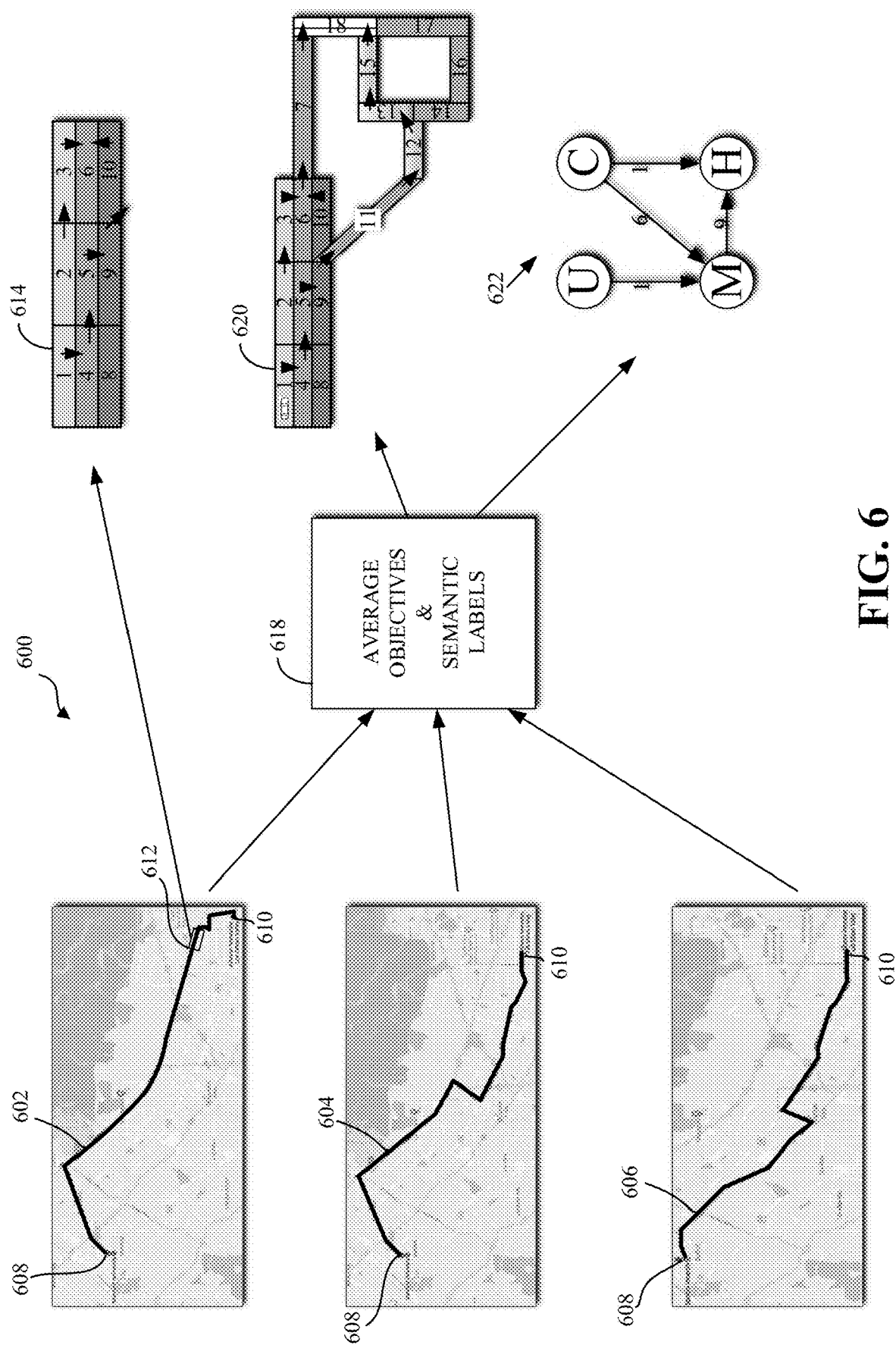
FIG. 6 illustrates a summary of learning and using a navigation map according to implementations of this disclosure.

FIG. 6 illustrates a summary 600 of learning and using a navigation map according to implementations of this disclosure. A lane-level route planner can include a learning module that obtains lane-level information. The lane-level route planner can be executed in a vehicle and the lane-level information can be incorporated in the navigation map of the vehicle. The lane-level information can be transmitted to a server, which may receive lane-level information from multiple vehicles. The server can incorporate the received lane-level information into the navigation map. The navigation map can then be used a lane-level route planner to obtain a policy (e.g., a route).

The summary 600 shows that three different routes 602, 604, and 606 were taken (by the same or more than one vehicle, not show) from an origin 608 to a destination 610. During the drives, lane-level information is collected for lane segments, such as lane segments 612. A history 614 indicates the learned lane transitions and the shading of the lane segments in the history 614 indicates learned characteristics of the lane segments. The history 614 includes other lane segment information learned as described herein.

The histories of at least some (e.g., all) of the lane segments along at least some (e.g., all) of the routes can be combined (e.g., counted, etc.) into the navigation map, as described herein. As described herein, multiple objectives and other semantic labels can be recorded in each lane segment history, as illustrated by a box 618.

Based on the learning, a state transition graph structure (i.e., the state transition function T, described above), illustrated by a transition graph 620, can be generated. The state transition graph can be used by an SSP MDP or POMDP model as described herein. The navigation map for the lane-level multi-objective lane-level route planner is then output (e.g., generated, etc.). The lane-level information of the navigation map includes the average of all the traversals of the vehicle of the lane segments. For example, the lane-level information includes one or more averages of speed, stop, density of perceived traffic, battery usage, lane change success rate, and so on.

Based on the learning, a cost (reward) function can also be generated for use in the SSP MDP or POMDP model. The average of different objectives can be recorded as the rewards, observing the times, transfer of control points, battery usage, speeds, and so on as described above. From the reward function, it can be known whether a slack is possible or not between objectives. For example, if a route takes an expectation of 10 minutes longer than the optimal, then a slack of at least 10 is possible. Such a reward function and slacks can be used to set preference orderings, as described with respect to FIG. 5 and illustrated with a preference ordering 622.

Figure 7:
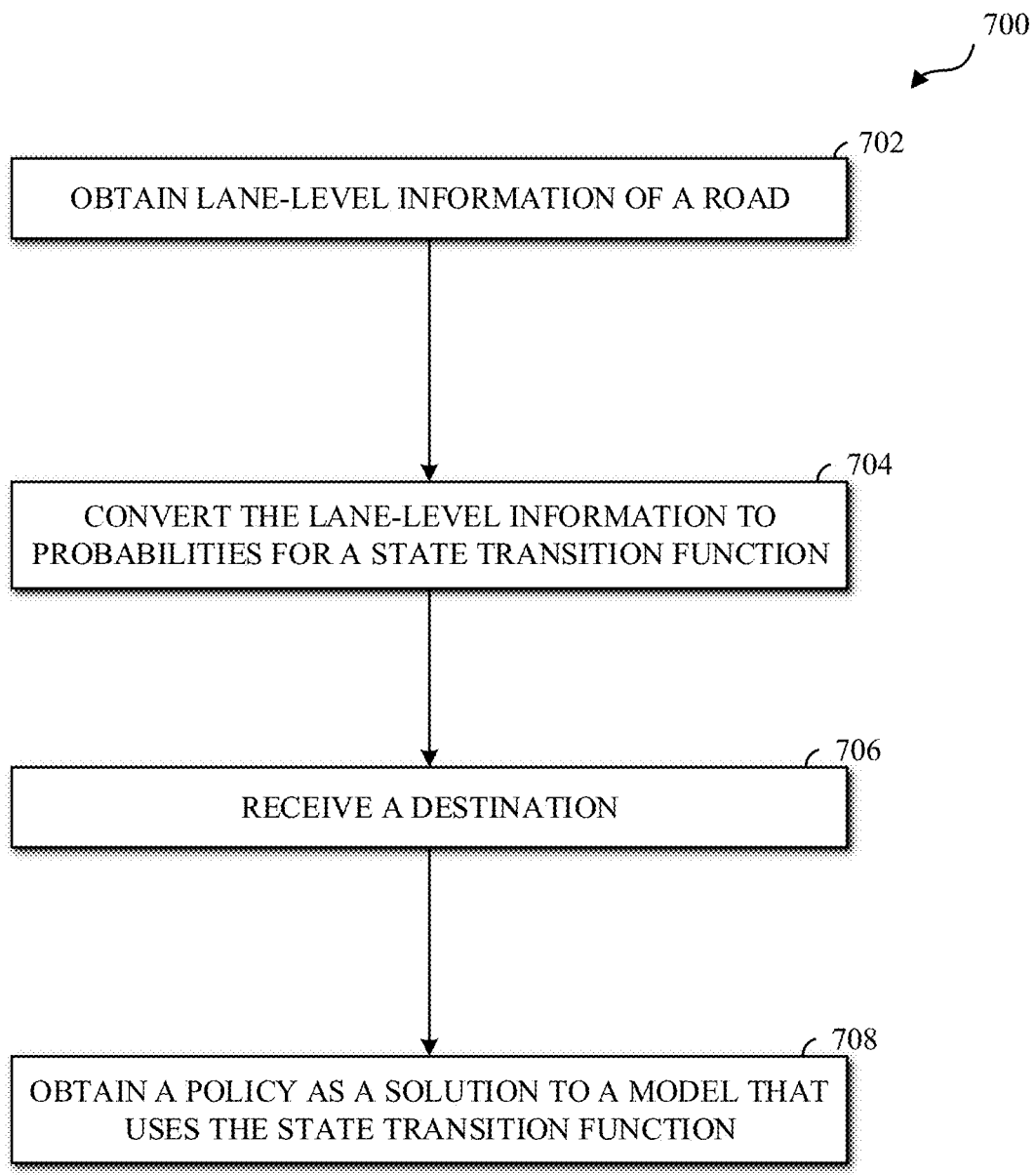
FIG. 7 is a flowchart diagram of an example of a technique for learning a navigation map for route planning in accordance with an embodiment of this disclosure.

FIG. 7 is a flowchart diagram of an example of a technique for learning a navigation map for route planning in accordance with an embodiment of this disclosure. The navigation map is then used by a lane-level route planner. The technique 300 can be partially or fully implemented in an apparatus, which can be a host vehicle such as the vehicle 100 shown in FIG. 1, one of the vehicles 210/211 shown in FIG. 2, a semi-autonomous vehicle, any other vehicle that may include drive-assist capabilities, or a vehicle that is manually controlled, such as by a driver. The apparatus can be a server can be the communication device 240 of FIG. 2.

The technique 700 can be implemented as instructions (e.g., operations) that are stored in a memory. The memory can be the memory 134 of FIG. 1. The memory can be a memory of the server. The instructions can be executed by a processor, such as the processor 133 of FIG. 1. The technique 700 can be implemented using specialized hardware or firmware. Multiple processors, memories, or both, may be used.

At 702, the technique 700 obtains lane-level information of a road. The lane-level information includes information of different segments of different lanes of the road. For example, the road can include a first lane and a second lane. The lane-level information includes first lane information related to the first lane and second lane information related to the second lane.

The lane-level information can be obtained at a host vehicle and the lane-level information can be used to evolve the navigation map of (e.g., used in, used by, available at, etc.) the host vehicle. The lane-level information can be obtained (e.g., received, etc.) at the server, which obtains lane-level information from several vehicles. The server can transmit an evolved navigation map to vehicles for use by their respective lane-level route planners. The server can use the evolved navigation map to calculate routes (e.g., policies).

As described above, the lane-level information can include at least one of environment information, vehicle information, or human information. The environment information can include at least one of traffic patterns, pedestrian patterns, or traversal difficulties information of lane segments. The vehicle information can include preferred routes of a user and transfer of control requests by the user.

In an example, obtaining the lane-level information of the road can include recording first times of automated traversal of the road with stop on the road; recording second times of automated traversal of the road without stops on the road; recording third times of manual traversal of the road with stop on the road; and recording fourth times of manual traversal of the road without stops on the road. In an example, obtaining the lane-level information of the road can include recording successor lane segments during manual traversal. In an example, obtaining the lane-level information of the road can include recoding overrides by a human of an automated travel control. Automated traversal of the road means that the vehicle is automatically controlled to traverse the road. Manual traversal of the road means that the vehicle is manually controlled (such as by a human) to traverse the road.

At 704, the technique 700 converts the lane-level information to a state transition function that can be used to obtain a route to a destination. As described above, the state transition function can be that of a TMDP or TPOMDP model. The route to the destination can be, or can be encapsulated in a policy, as described above. In an example, the policy, and thus the route, can be stochastic.

At 706, the technique 700 receives a destination. For example, the server (more specifically, a lane-level route planner executing at the server) can receive (such as from a user device, a mapping application of a vehicle, or the like) a current location and a destination, can obtain a route. For example, the lane-level route planner executing at the apparatus can receive the destination from a user (such as a driver or an occupant) and the lane-level route planner can obtain a route. In some example, the lane-level route planner can infer the origin location for the route, such as based on a current location of the apparatus.

At 708, the technique 700 obtains a policy as a solution to a model that uses the state transition function.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for lane-level route planning, comprising:
    obtaining lane-level information of a road,
        wherein the road comprises a first lane and a second lane, and
        wherein the lane-level information comprises first lane information related to the first lane and second lane information related to the second lane;
    converting the lane-level information to probabilities for a state transition function;
    obtaining a policy as a solution to a model that uses the state transition function,
        wherein, given that a vehicle is on a first lane segment, the policy provides an action for controlling the vehicle with respect to moving to a second lane segment that neighbors the first lane segment,
        wherein the model is a decision process that incorporates, into a cost function, a user preference for objectives including a first objective relating to comfort, a second objective relating to autonomy, and a third objective relating to urban lane segments, and a user input indicating a slack time for alternative routes to a destination relative to the user preference,
        wherein the cost function represents an expected immediate cost of performing the action in a state,
        wherein the first objective relating to comfort indicates a preference for lane segments where traffic moves at speeds that are within a threshold speed of speed limits on the lane segments,
        wherein the second objective relating to autonomy indicates a preference for lane segments where an autonomous vehicle (AV) can be autonomously controlled as opposed to being manually controlled,
        wherein the third objective relating to urban lane segments indicates whether to maximize selection of lane segments classified as urban over lane segments that are not classified as urban, and
        wherein the slack time indicates an allowable deviation in travel time relative to the user preference;
    receiving the destination; and
    at time steps along a route to the destination, autonomously controlling the AV according to one or more respective actions obtained from the policy based on respective current lanes of the AV.

2. The method of claim 1, wherein the lane-level information is obtained at a host vehicle.

3. The method of claim 1, wherein the lane-level information is obtained from several vehicles.

4. The method of claim 1, wherein the lane-level information comprises at least two of environment information, vehicle information, or human information.

5. The method of claim 4, wherein the environment information comprises at least two of traffic patterns, pedestrian patterns, or traversal difficulties information of lane segments.

6. The method of claim 4, wherein the vehicle information comprises preferred routes of a user and transfer of control requests by the user.

7. The method of claim 1, wherein obtaining the lane-level information of the road comprises:
recording first times of automated traversal of the road with stop on the road;
recording second times of automated traversal of the road without stops on the road;
recording third times of manual traversal of the road with stop on the road; and
recording fourth times of manual traversal of the road without stops on the road.

8. The method of claim 1, wherein obtaining the lane-level information of the road comprises:
recording successor lane segments during manual traversal.

9. The method of claim 1, wherein obtaining the lane-level information of the road comprises:
recording overrides by a human of an automated travel control.

10. An apparatus for lane-level route planning, comprising:
a processor configured to:
obtain lane-level information of a road,
wherein the road comprises a first lane and a second lane, and
wherein the lane-level information comprises first lane information related to the first lane and second lane information related to the second lane;
convert the lane-level information to a state transition function;
obtain a policy as a solution to a model that uses the state transition function,
wherein, given that a vehicle is on a first lane segment, the policy provides an action for controlling the vehicle with respect to moving to a second lane segment that neighbors the first lane segment,
wherein the model incorporates, into a cost function, a user preference for objectives including at least a first objective relating to comfort and a second objective relating to urban lane segments, and a user input indicating a slack time for alternative routes to a destination relative to the user preference,
wherein the cost function represents an expected immediate cost of performing the action in a state,
wherein the first objective relating to comfort indicates a preference for lane segments where traffic moves at speeds that are within a threshold speed of speed limits on the lane segments,
wherein the second objective relating to urban lane segments indicates whether to maximize selection of lane segments classified as urban, and
wherein the slack time indicates an allowable deviation in travel time relative to the user preference;
receive the destination over lane segments that are not classified as urban; and
at time steps along a route to the destination, autonomously control an AV according to one or more respective actions obtained from the policy based on respective current lanes of the AV.

11. The apparatus of claim 10, wherein the lane-level information is obtained from a host vehicle.

12. The apparatus of claim 10, wherein the lane-level information is obtained from several vehicles.

13. The apparatus of claim 10, wherein the lane-level information comprises at least two of environment information, vehicle information, or human information.

14. The apparatus of claim 13, wherein the environment information comprises at least two of traffic patterns, pedestrian patterns, or traversal difficulties information of lane segments.

15. The apparatus of claim 13, wherein the vehicle information comprises preferred routes of a user, transfer of control requests by the user.

16. The apparatus of claim 10, wherein obtaining the lane-level information of the road comprises:
recording first times of automated traversal of the road with stop on the road;
recording second times of automated traversal of the road without stops on the road;
recording third times of manual traversal of the road with stop on the road; and
recording fourth times of manual traversal of the road without stops on the road.

17. The apparatus of claim 10, wherein obtaining the lane-level information of the road comprises:
recording successor lane segments during manual traversal; and
recording overrides by a human of an automated travel control.

18. The apparatus of claim 10, wherein the objectives further include a third objective relating to autonomy, wherein the third objective relating to autonomy indicates a preference for lane segments where an autonomous vehicle (AV) can be autonomously controlled as opposed to being manually controlled.

19. A non-transitory computer-readable storage medium, comprising executable instructions that, when executed by a processor, facilitate performance of operations comprising operations to:
receive from vehicles traversing a road respective lane-level information;
obtain a navigation map from lane-level information received from the vehicles, the navigation map comprising a state transition graph and a reward function, wherein the lane-level information comprises at least two of environment information, vehicle information, or human information;
transmit the navigation map to a vehicle, wherein the vehicle uses the navigation map to obtain lane-level routes;
obtain a policy as a solution to a model that uses the state transition function,
wherein, given that a vehicle is on a first lane segment, the policy provides an action for controlling the vehicle with respect to moving to a second lane segment that neighbors the first lane segment,
wherein the model incorporates, into a cost function, a user preference for objectives including a first objective relating to urban lane segments and a second objective relating to comfort, and a user input indicating a slack time for alternative routes to a destination relative to the user preference,
wherein the cost function represents an expected immediate cost of performing the action in a state,
wherein the first objective relating to urban lane segments indicates whether to maximize selection of lane segments classified as urban over lane segments that are not classified as urban, wherein the second objective relating to comfort indicates a preference for lane segments where traffic moves at speeds that are within a threshold speed of speed limits on the lane segments, and wherein the slack time indicates an allowable deviation in travel time relative to the user preference;

receive the destination; and at time steps along the lane-level routes to the destination, autonomously control an AV according to one or more respective actions obtained from the policy based on respective current lanes of the AV.

20. The non-transitory computer-readable storage medium of claim 19, wherein the objectives further include:

a third objective relating to autonomy that indicates a preference for lane segments where an autonomous vehicle (AV) can be autonomously controlled as opposed to being manually controlled.

\* \* \* \* \*